United States Patent

Iemura

[11] Patent Number: 5,933,053
[45] Date of Patent: Aug. 3, 1999

[54] BURST DEMODULATOR

[75] Inventor: Takaya Iemura, Tokyo, Japan

[73] Assignee: NEC Corporation, Tokyo, Japan

[21] Appl. No.: 09/027,554

[22] Filed: Feb. 23, 1998

[30] Foreign Application Priority Data

Feb. 28, 1997 [JP] Japan ................................ 9-046610

[51] Int. Cl.$^6$ .......................... H03D 3/00; H04L 27/22
[52] U.S. Cl. ...................... 329/311; 329/304; 329/310; 375/329; 375/342
[58] Field of Search ...................... 329/304, 306–309, 329/310, 311; 375/324, 328–333, 340, 342, 360

[56] References Cited

U.S. PATENT DOCUMENTS

4,797,678  1/1989  Tsuji et al. .............................. 342/352

Primary Examiner—David Mis
Attorney, Agent, or Firm—Young & Thompson

[57] ABSTRACT

A burst demodulator prevents transmission efficiency from being lowered, and a dynamic range of an input strength from being narrowed, by providing a stable frame signal even if the reaction is rapid against the input and the input strength is low. A logarithm amplifier outputs an electric power strength of a modulated input signal as a logarithm value, and an integrator smooths the output of the logarithm amplifier and outputs the smoothed output as an RSSI. The comparator compares the RSSI with the appropriate reference value REF while including some margin within the noise level, and outputs the frame signal of an 'LO' state when the RSSI is lower than the REF, that is, during the non-signal zone, of an 'HI' state when the RSSI is higher than the REF, that is, during the signal zone. The period of the comparator output continuously remaining in the 'LO' state cannot exceed one clock period even if the comparator output flutters within one time slot. When the comparator output is fixed to the 'LO' state and the CLK is input by two clocks, the output of the counter becomes the 'HI' state, whereby the output of the counter and the OR computing element mask the CLK, which fixes the counter output to the 'HI' state until the comparator output becomes the 'HI' state again.

12 Claims, 9 Drawing Sheets

| PR | UW | DATA |

Figure. 8

(PRIOR ART)

BURST DEMODULATOR

BACKGROUND OF THE INVENTION

1. Field of the Invention

The invention relates to a burst demodulator, and more particularly to a burst demodulator in a TDMA (Time Division Multiplex Access) system which sharply and stably provides a signal recognizing a first and a last position of a burst modulated input signal to a receiver side.

2. Description of the Prior Art

A demodulator is required to detect a first and a last position of a received signal when demodulating burst signals divided into time slots such as in TDMA. Generally, the signal representing the first and the last position of each of the burst signals (hereinafter referred to as "the frame signal") can be obtained by inputting a receive signal strength indicator (hereinafter referred to as "the RSSI") and a suitable threshold value to a comparator, and then causing the comparator to compare them.

Figure 7:
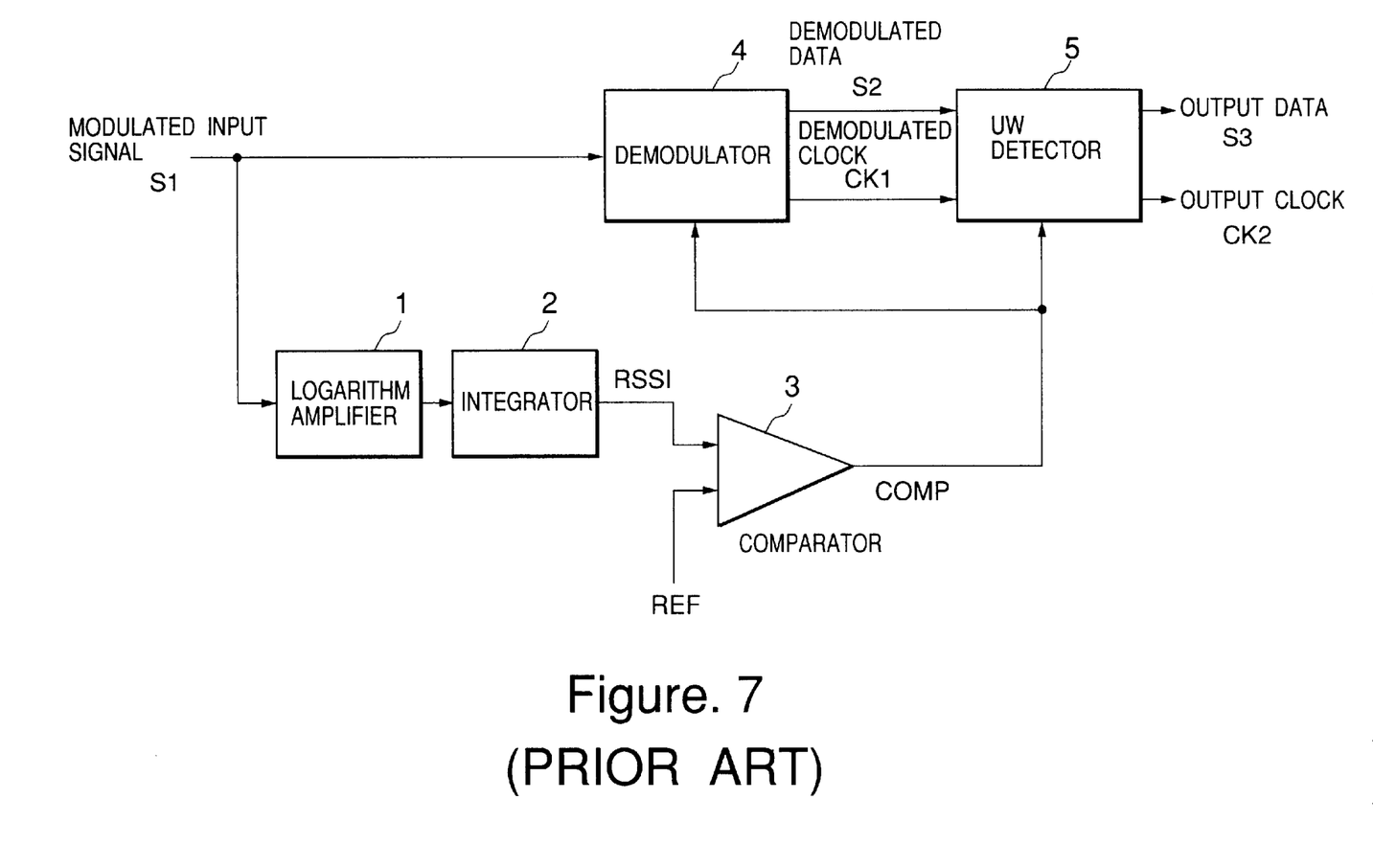
FIG. 7 is a block diagram showing a construction of a conventional burst demodulator.

FIG. 7 shows a block diagram of a conventional burst demodulator. The block diagram shown in FIG. 7 is comprised of a logarithm amplifier 1 for outputting a power level of a modulated input signal S1 as a logarithm value, an integrator 2 for receiving and smoothing an output of the logarithm amplifier 1 and outputting the smoothed output as the RSSI, a comparator 3 for receiving the RSSI from the integrator 2, comparing the RSSI with a previously set appropriate reference value REF, and outputting the frame signal, a demodulator 4 for receiving the modulated input signal and an output of the comparator 3, and performing a demodulating operation, and a unique word detector 5 for receiving demodulated data S2 produced by the demodulator 4 and a demodulated clock CK1 which is in synchronization with the demodulated data S2, detecting a unique word (hereinafter referred to as "the UW"), and outputting output data S3 obtained by removing a preamble and the UW from the demodulated data S2, and the output clock CK2 which is in synchronization with the output data S3.

As noted above the comparator 3 compares the RSSI with the appropriate reference value REF while including some margin within the noise level. The comparator 3 thereafter outputs the frame signal of a 'LO' (low) state when the RSSI is lower than the REF, that is, during the non-signal zone, and of a 'HI' (high) state when the RSSI is higher than the REF, that is, during the signal zone.

Figure 8:
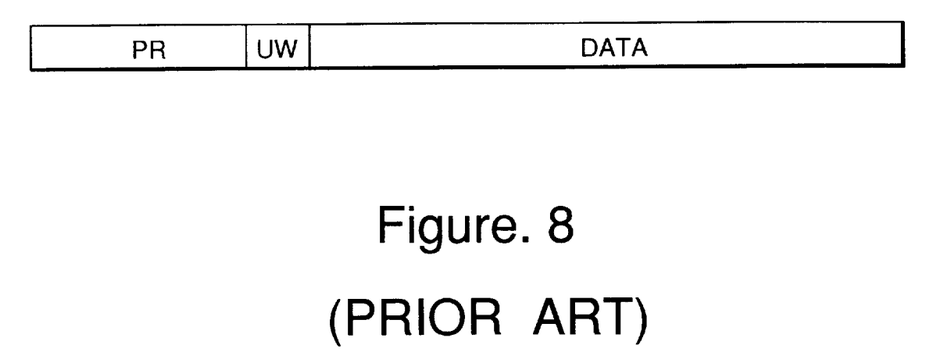
FIG. 8 is a view showing a construction of the time slots in FIG. 7.

FIG. 8 shows a time slot configuration of a general burst modulated input signal s1. The time slot is comprised of a PR (preamble) portion including a fixed pattern for recovering carriers and clocks, the UW portion, and a DATA portion including information data.

The demodulator 4, which remains in a reset state when the frame signal is in the 'LO' state, recovers the clocks and the carriers by using the PR simultaneously when the frame signal becomes the 'HI' state. And the demodulator 4 outputs the demodulated data S2 of the base band signal and the demodulated clock CK1 which is synchronized with the demodulated data S2.

The UW detector 5, which remains in a reset state when the frame signal is in the 'LO' state, starts the UW detecting operation simultaneously when the frame signal becomes the 'HI' state. And the UW detector 5 outputs, when detecting the UW, the output data S3 obtained by removing the PR and the UW from the demodulated data and the output clock CK2 which is synchronized with the output data S3.

The above operation enables the input signal to be detected, thereby providing a demodulating operation.

The RSSI is determined by the output signal of the logarithm amplifier 1. The output of the logarithm amplifier 1 is in turn a signal obtained by full-wave rectification of the modulated input signal. Therefore, it is affected by the carrier signal and the clock frequency. As the carrier signal is a high frequency signal, it can be deleted by inputting the output of the logarithm amplifier 1 to a simple integrator 2.

Figure 9:
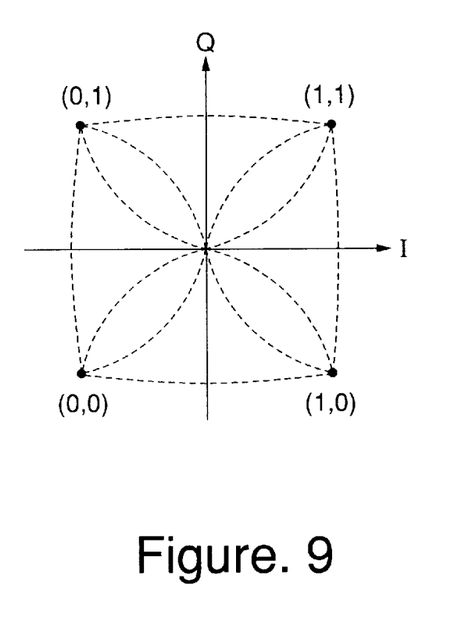
FIG. 9 is a view showing a QPSK signal arrangement in FIG. 7.

FIG. 9 shows an example of the symbol arrangement on a phase plane in a case where the modulating system is a QPSK (quadrature phase shift keying) type, in which the dotted lines represent the loci on which the symbol is moved. In a case where the symbol is moved between the positions which are line-symmetrical with respect to each of an I and a Q-axis, such as between (1, 1) and (0, 1), an amplitude of the modulated input signal (the distance from an origin to a signal point) does not change largely. On the other hand, in a case where the symbol is moved between the positions which are point-symmetrical with respect to the origin, the amplitude becomes remarkably small, as is apparent from the loci of FIG. 9.

Figure 10:
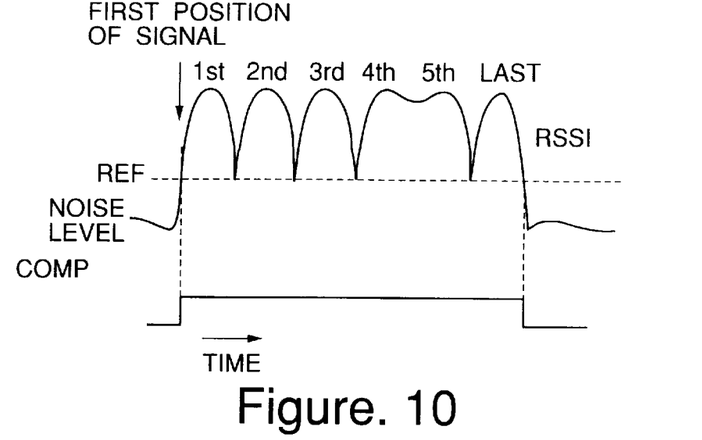
FIG. 10 is a view showing a state of the time slot signal in the construction of FIG. 7.

FIG. 10 illustrates the relation between the RSSI and the reference value REF and the comparator output COMP. The depicted RSSI corresponds to a case where a modulated input signal comprising six symbols from the first symbol to the last symbol is inputted. According to the above description, the change from the fourth symbol to the fifth one does not greatly change the RSSI, which shows that the change is line-symmetrical with respect to the I (in-phase) or the Q (quadrature-phase) axis. The other changes cause the RSSI to drop largely, which shows that the changes are point-symmetrical with respect to the origin.

When the reference value REF is set as shown in FIG. 10 while including some margin within the noise level, the frame signal (comparator output) can be stably output, albeit with difficulty, from the first to the last position thereof.

Figure 11:
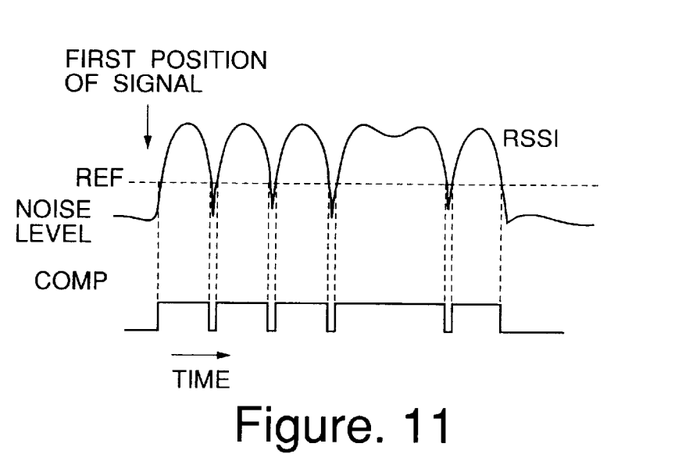
FIG. 11 is a view showing a state of the time slot signal in the construction of FIG. 7.

On the contrary, in a case where the RSSI, as shown in FIG. 11, is smaller than that shown in FIG. 10, the frame signal flutters unpredictably at an intermediate portion of the essential time slot. Inputting the above RSSI to the comparator causes the frame signal to flutter unpredictably at the intermediate portion of the time slot. Usually, the demodulator 4 is, in order to reconstruct the clocks and the carriers stably and at high speed, adapted to be reset in operation so as to disable the clocks and the carriers to be recovered by using the data except the PR when the frame signal is in the 'LO' state. Moreover, the UW detector 5 is, in order to prevent the false detection rate from increasing by the UW detector 5 operating when not receiving the signal, adapted to be reset in operation when the frame signal is in the 'LO' state. Therefore, the frame signal fluttering at the intermediate portion of the time slot disrupts the stable demodulating operation.

There are two methods for preventing the frame signal from fluttering in the conventional construction. The first one is to increase the input level to the logarithm amplifier 1 so as to prevent the RSSI from becoming lower than the state shown in FIG. 10, which requires increasing the transmission level or increasing the gain in the receiver side. In either case, these approaches are limited due to distortion, electric power consumption, or other problems. Moreover, this method cannot solve such a problem that the signal of low input level cannot be stably detected, which causes the further problem that the first method ultimately unduly narrows the dynamic range of the input signal.

Figure 12:
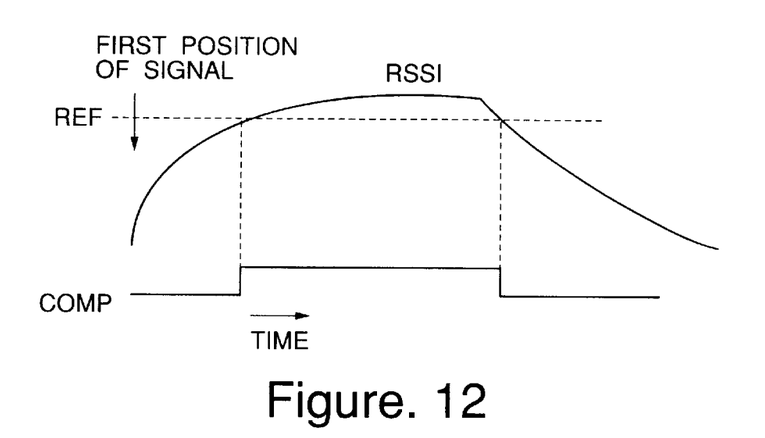
FIG. 12 is a view showing a state of the time slot signal when the integrator in FIG. 7 has a large time constant.

Moreover, the second approach is to increase the time constant of the integrator 2 and then smooth the waveform of the RSSI. FIG. 12 is a view showing a thus-smoothed RSSI and the comparator output COMP. FIG. 12 shows the data for several tens and several hundreds of symbols, but does not show data for only several symbols, as shown in FIGS. 10 and 11.

Therefore, smoothing to this degree by simple integration allows the comparator output to be retarded by not less than several tens of symbols with respect to the first portion of the actual signal, which requires an extended guard time (non-signal period between the time slots) and preamble, which lower the transmission efficiency.

SUMMARY OF THE INVENTION

The present invention therefore has an object to provide a burst demodulator which provides a stable frame signal detection without narrowing a dynamic range of an input level and without lowering transmission efficiency.

In order to solve the above problems, the present invention provides a burst demodulator for demodulating a burst modulated input signal, characterized by detecting a receive signal strength indicator (hereinafter referred to as 'RSSI') from the burst modulating input signal, retarding a comparison output between the RSSI and a predetermined value by a predetermined time constant, and demodulating the retarded signal as a signal representing a first and a last position of the burst modulated input signal (hereinafter referred to as 'frame signal').

In one embodiment, the predetermined time constant is characterized by being determined by a timer circuit for receiving the comparison output and clocks demodulated from the burst demodulating signal, and for providing retardation for a maximum period of two of the clocks when the comparison output drops.

The predetermined time constant of that embodiment is advantageously obtained by a first timer circuit for receiving the comparison output at a reset terminal of a counter, logically summing an output of the counter and an output of the clock, inputting the summed output to a clock terminal of the counter, and inverting the output of the counter.

In another embodiment, the predetermined time constant is characterized by being obtained by a second timer circuit for retarding the comparison output through a resistor and a capacitor which are connected in parallel.

As described above, the invention presents a stable and fast frame signal detection even if the input level is very low. Thereby the present invention realizes the burst demodulator which prevents the transmission efficiency from being lowered, and the dynamic range of the input level from being narrowed. dr

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF THE PREFERRED EMBODIMENTS OF THE INVENTION

Figure 1:
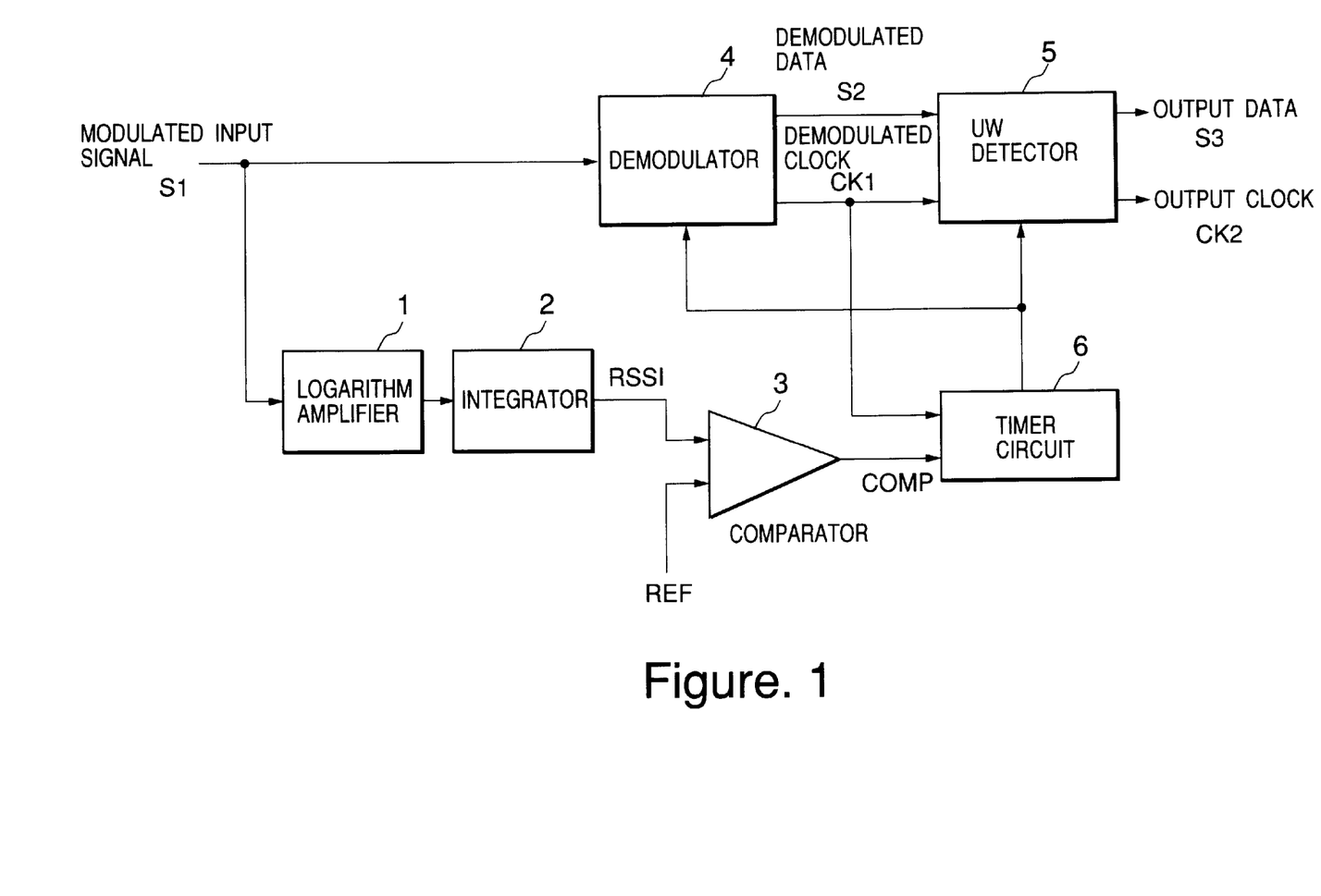
FIG. 1 is a block diagram showing a construction of a burst demodulator according to a first embodiment of the invention.

The block diagram shown in FIG. 1 is comprised of a logarithm amplifier 1 for outputting a power level of a modulated input signal S1 as a logarithm value, an integrator 2 for receiving and smoothing an output of the logarithm amplifier 1 and outputting the smoothed output as the RSSI, a comparator 3 for receiving the RSSI output by the integrator 2, comparing the RSSI with a previously set appropriate reference value REF, and outputting the frame signal, a demodulator 4 for receiving the modulated input signal s1 and an output of the timer circuit 6, and providing a demodulating operation, a UW detector 5 for receiving demodulated data S2 output by the demodulator 4 and a demodulated clock CK1 which is in synchronization with the demodulated data, detecting the UW, and outputting output data S3 obtained by removing a preamble and the UW from the demodulated data S2, and output clock CK2 which is in synchronization with the data portion S3, and a timer circuit 6 that prevents an output signal of the demodulator 4 from fluttering by using an output of the comparator 3 and the demodulated clock obtained by the demodulator 4. Elements of the above embodiment corresponding to those of FIG. 7 are designated by the same reference numerals, and detailed description thereof is omitted.

Next, an operation of the construction of FIG. 1 will be described hereinbelow.

The logarithm amplifier 1 outputs the power level of the modulated input signal S1 as a logarithm value, and the integrator 2 smooths the output of the logarithm amplifier 1 and outputs the smoothed output as the RSSI. The comparator 3 compares the RSSI with the appropriate reference value REF while including some margin within the noise level, and outputs the frame signal of a 'LO' state when the RSSI is lower than the REF, that is, during the non-signal zone, and of a 'HI' state when the RSSI is higher than the REF, that is, during the signal zone.

However, in a case where the input level is lower than some threshold as described above, the frame signal is excessively fluttered at the intermediate portion of the time slot, which problem is solved by the timer circuit 6.

Figure 2:
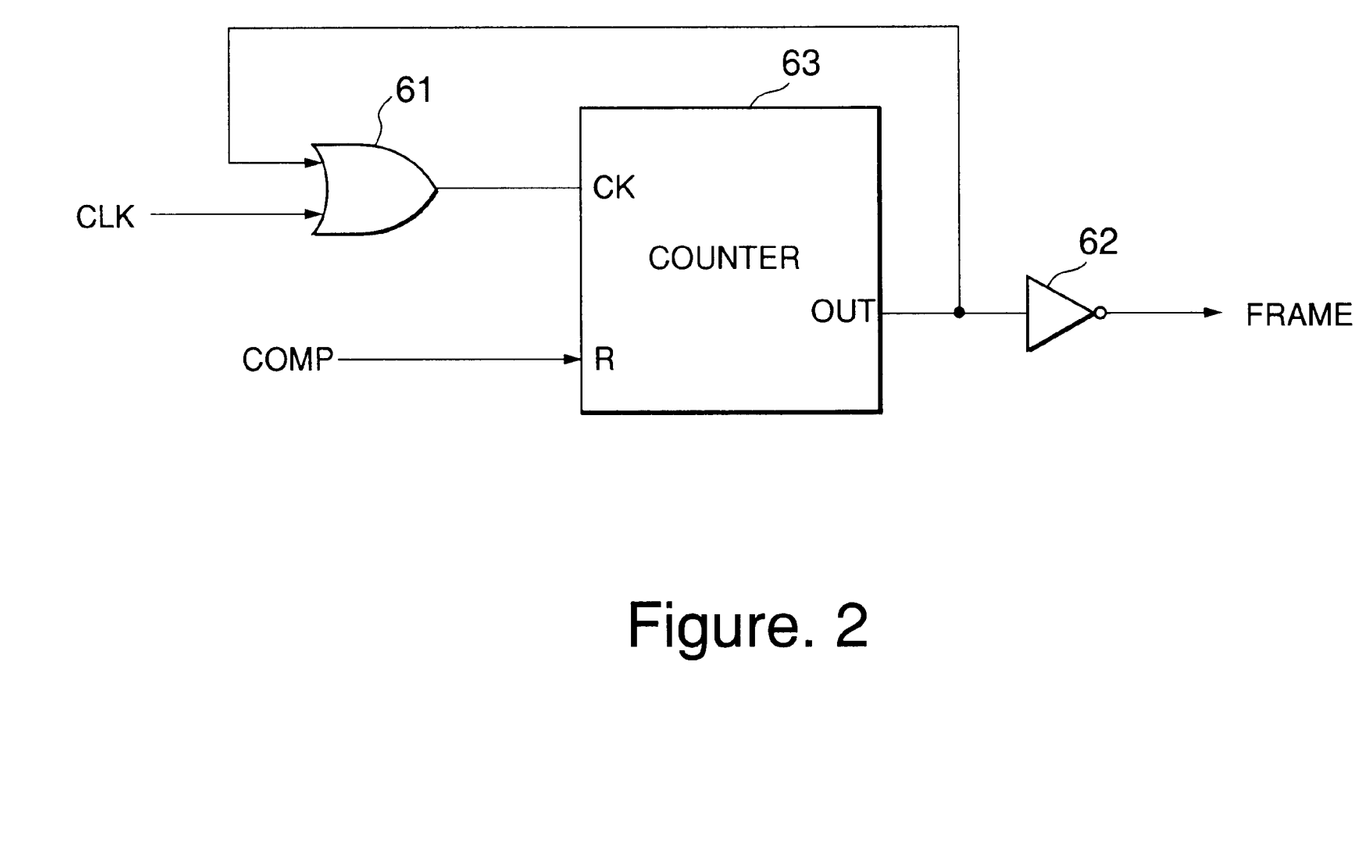
FIG. 2 is a block diagram showing a particular construction of the timer circuit in FIG. 1.
Figure 3:
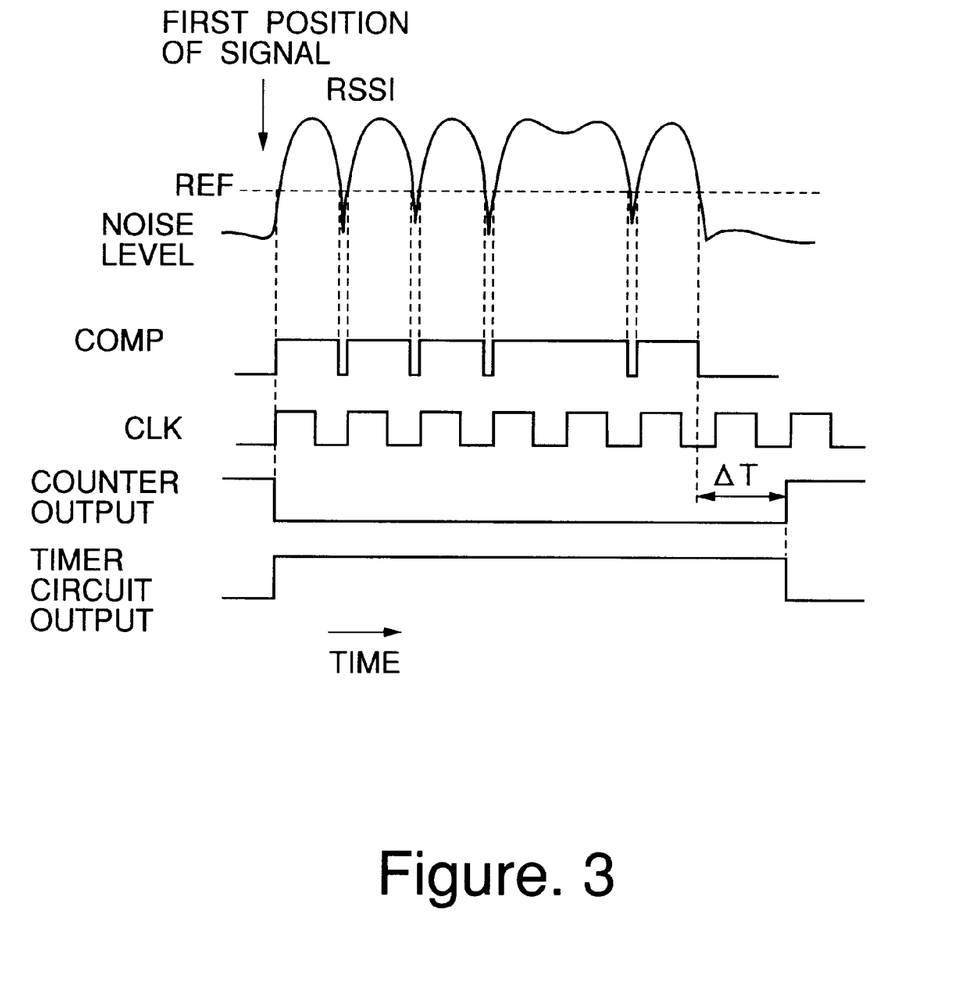
FIG. 3 is a view showing a state of a time slot signal according to the construction of FIG. 1.

Next, there is shown in FIG. 2 a specific block diagram of the timer circuit 6. The timer circuit 6 is comprised of an OR gate 61, an inverter 62, and a counter 63. The counter 63 is comprised of a 'HI' active reset terminal R, a clock input terminal CK, and a 2-bit counter output OUT. FIG. 3 is a view showing the RSSI, the comparator output COMP, the CLK, the counter output, and the timer circuit output, in the timer circuit 6. The RSSI drops largely only when the symbol moves between the positions which are point-symmetrical with respect to the origin; therefore, the period of the comparator output continuously remaining in the 'LO' state cannot exceed one clock period even if the comparator output flutters in one time slot. As a result, when the comparator output is input to the reset terminal of counter 63 and counted up by the CLK, the value of the counter only shows '00', or '01' in one time slot, thereby fixing the output of the counter 63 to the 'LO' state. Then, when the comparator output COMP is fixed to the 'LO' state and the CLK is input by two clocks, the output of the counter 63 becomes the 'HI' state, whereby the output of the counter 63 and the OR gate 61 mask the CLK, which fixes the counter output to the 'HI' state until the comparator output becomes the 'HI' state again. The timer circuit output is obtained by inverting the output of the counter 63, thereby enabling the comparator to continue to stably output 'HI' so long as the 'LO' state is not realized continuously over two clocks after the comparator output is once raised to the 'HI' state.

In the above description, the frame signal detection is detecting the frame signal based on a continuous time obtained by a comparison between said RSSI with a predetermined value and ignoring changes of said comparison that are less than one symbol of said burst modulated input signal.

The above operation retards the frame signal dropping by a maximum period of two CLKs with respect to the actual time slot; however, it scarcely retards the frame signal from rising, which ensures a stable frame signal in one time slot, to thereby realize the burst demodulator which prevents the transmission efficiency from being lowered, and the dynamic range of the input strength from being narrowed.

SECOND EMBODIMENT

Figure 4:
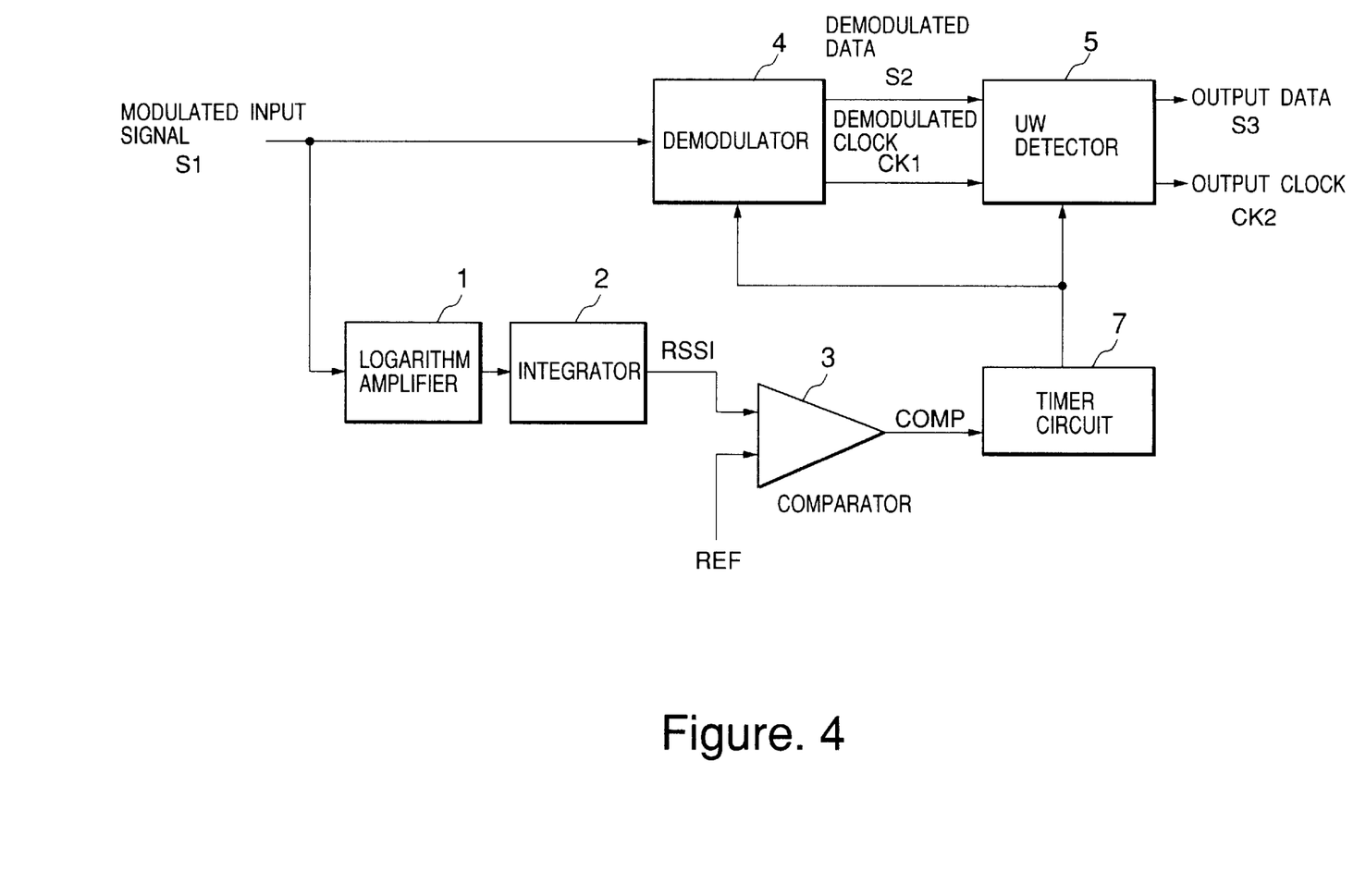
FIG. 4 is a block diagram showing a construction of a burst demodulator according to a second embodiment of the invention.

FIG. 4 shows a block diagram of a second embodiment according to the invention. The block diagram shown in FIG. 4 differs from that of FIG. 1 in that the timer circuit 7 receives only the output of the comparator 3, whereas the timer circuit 6 in FIG. 1 receives the output of the comparator 3 and the demodulated clock output by the modulator 4.

Next, an operation of the block diagram of FIG. 4 will be described hereinbelow.

Figure 5:
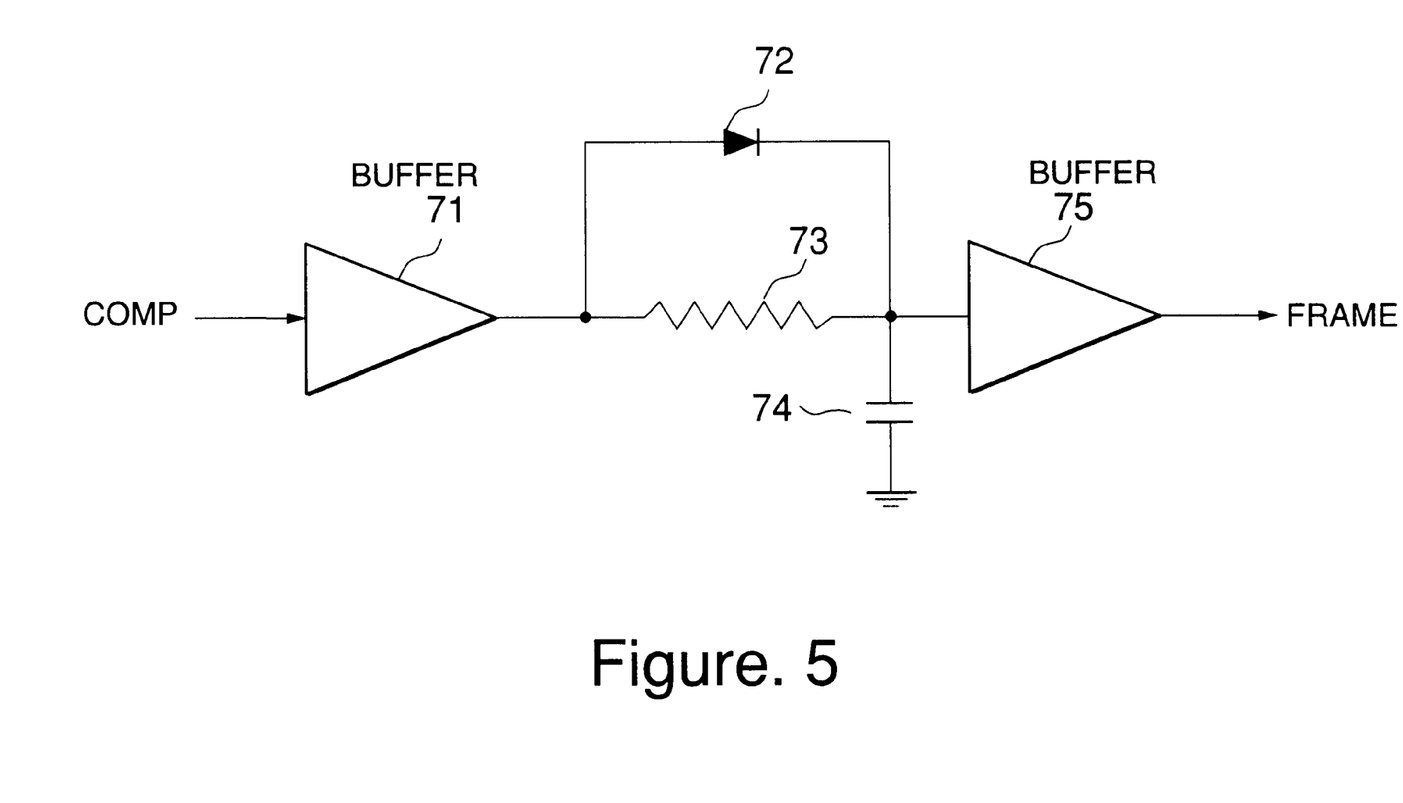
FIG. 5 is a block diagram showing a particular construction of the timer circuit in FIG. 4.

FIG. 5 is a view showing a particular construction of the timer circuit 7. In FIG. 5, the timer circuit 7 is comprised of buffer amplifiers 71, 75, a diode 72, a resistor 73, and a capacitance 74.

Figure 6:
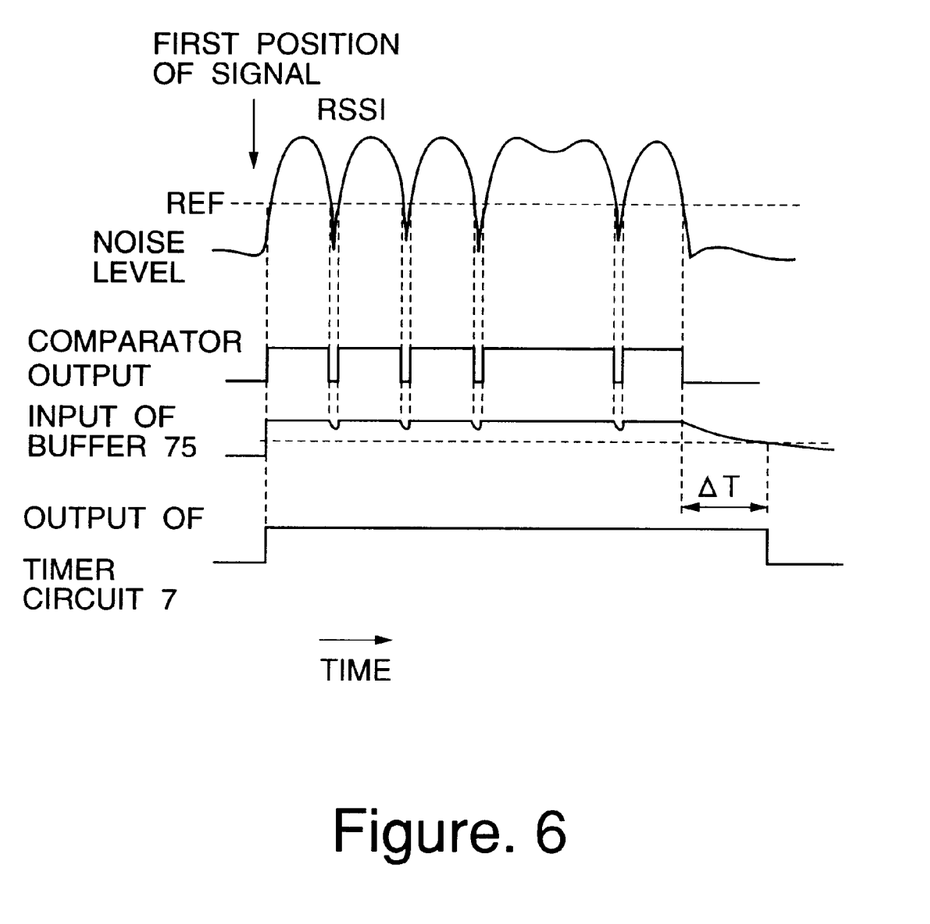
FIG. 6 is a view showing a state of a time slot signal according to the construction of FIG. 4.

As described above, the comparator output cannot be of the 'LO' state continuously over one clock period even if the comparator output flutters in one time slot. The buffer 71 outputs substantially the same waveform as that of the comparator output. When the output of the buffer 71 is changed from the 'HI' state to the 'LO' state, the input of the buffer 75 is gradually raised according to the time constant determined by the resistor 73 and the capacitance 74. On the other hand, when the output of the buffer 71 is changed from the 'LO' state to the 'HI' state, the diode 72 passes the electric current through the resistor 73, thereby sharply raising the input of the buffer 75. In that case, the output of the buffer 71 is shown in FIG. 6. Therefore, the retardation of the raising of output of the timer circuit 7 with respect to the actual time slot does not become a problem. Moreover, it is recommended that the time constant be reduced to a minimum which prevents the output from dropping from the 'HI' state down to the threshold during one clock period even if the dropping is subjected to the retardation.

As described above, two embodiments are explained by using the QPSK modulation. Of course, this invention is not restricted to the case of QPSK modulation. If modulation is orthogonal digital modulation, any modulation type is available.

The invention slightly retards the frame signal dropping with respect to the actual time slot; however, it only slightly retards the frame signal from rising, which ensures a stable frame signal in one time slot, to thereby realize a burst demodulator which prevents the transmission efficiency from being lowered, and the dynamic range of the input level from being narrowed.

What is claimed is:

1. A burst signal demodulator for demodulating a burst modulated input signal, comprising:

RSSI detection means for detecting a receive signal strength indicator from said burst modulated input signal;

frame signal detection means for detecting a frame signal based on a continuous time obtained by a comparison between said RSSI with a predetermined value;

timer means for ignoring a change of said comparison that occurs for less than one symbol of said burst modulated input signal, thereby to generate said frame signal unaffected by flutter in said RSSI; and demodulation means for demodulating said burst modulated input signal based on said frame signal.

2. The burst signal demodulator as claimed in claim 1 in which said continuous time is a time during which said RSSI is higher than said predetermined value.

3. A burst signal demodulator for demodulating a burst modulated input signal, comprising:

a RSSI detector for detecting a receive signal strength indicator from said burst modulated input signal;

a frame signal detector for detecting a frame signal based on a continuous time obtained by a comparison between said RSSI with a predetermined value;

a timer circuit for ignoring a change of said comparison for less than one symbol of said burst modulated input signal, thereby to generate said frame signal unaffected by flutter in said RSSI; and a demodulator for demodulating said burst modulated input signal based on said frame signal.

4. The burst signal demodulator as claimed in claim 3 in which said continuous time is a time during which said RSSI is higher than said predetermined value.

5. A burst signal demodulator for demodulating a burst modulated input signal, comprising:

a RSSI detector for detecting a receive signal strength indicator from said burst modulated input signal;

a frame signal detector for detecting a frame signal based on retardation of a comparison output between said RSSI and a predetermined value by a predetermined time constant; and a demodulator for demodulating said burst modulated input signal based on an output of said frame signal detector.

6. The burst signal demodulator as claimed in claim 5, wherein said frame signal detector comprises:

a comparator for comparing said RSSI with a predetermined value; and a timer circuit for delaying an output of said comparator by a predetermined time constant.

7. The burst signal demodulator as claimed in claim 5, said timer circuit comprising:

a delay circuit for receiving clocks demodulated from said burst modulated input signal and for providing retardation for a maximum period of two of said clocks when said comparison output drops.

8. The burst signal demodulator as claimed in claim 5, said timer circuit comprising:

a counter for receiving said comparison output at a reset terminal and for counting two of said clocks;

a logical sum circuit for summing an output of said counter and said clocks and for inputting said summed output to a clock terminal of said counter; and an inverter for inverting said output of said counter.

9. The burst signal demodulator as claimed in claim 5, said timer circuit comprising:

a circuit for retarding said comparison output through a resistor and a capacitor connected in parallel.

10. A burst signal demodulator for demodulating a burst modulated input signal comprising:

a logarithm amplifier for receiving said burst modulated input signal and for outputting said received signal as a logarithm value;

an integrator for integrating an output of said logarithm amplifier and removing high frequency components therefrom;

a comparator for comparing an output of said integrator with a predetermined reference value to determine whether or not said modulated input signal is present;

a demodulator for performing a demodulating operation based on said burst modulated input signal and a frame signal representing a first and a last position of said burst modulated signal to output demodulated data, and for outputting demodulated clocks in synchronization with said demodulated data;

a unique word detector for detecting a unique word based on said demodulated data, said demodulated clocks, and said frame signal; and a timer circuit for receiving an output of said comparator and said demodulated clocks and compensating a fluctuation in an output signal of said comparator within one time slot.

11. The burst signal demodulator as claimed in claim 10, said timer circuit comprising:

a counter for receiving said comparison output at a reset terminal and for counting two of said clocks;

a logical sum circuit for summing an output of said counter and said clocks and for inputting said summed output to a clock terminal of said counter; and an inverter for inverting said output of said counter.

12. The burst signal demodulator as claimed in claim 10, said timer circuit comprising:

a resistor and a capacitor for providing retardation according to a predetermined time constant;

a diode connected in parallel to said resistor for passing an electric current.

* * * * *